United States Patent
Sanchez Bermudez et al.

(10) Patent No.: US 12,536,653 B2
(45) Date of Patent: Jan. 27, 2026

(54) METHOD FOR PROCESSING A RADIOLOGICAL IMAGE

(71) Applicant: THALES, Courbevoie (FR)

(72) Inventors: Fernando Manuel Sanchez Bermudez, Autrans-Meaudre en Vercors (FR); Sébastien Gorges, saint Jean de Moirans (FR); Catherine Girard, Moirans (FR)

(73) Assignee: THALES, Courbevoie (FR)

(*) Notice: Subject to any disclaimer, the term of this patent is extended or adjusted under 35 U.S.C. 154(b) by 357 days.

(21) Appl. No.: 18/032,551

(22) PCT Filed: Oct. 18, 2021

(86) PCT No.: PCT/EP2021/078760
§ 371 (c)(1),
(2) Date: Apr. 18, 2023

(87) PCT Pub. No.: WO2022/084223
PCT Pub. Date: Apr. 28, 2022

(65) Prior Publication Data
US 2023/0289958 A1  Sep. 14, 2023

(30) Foreign Application Priority Data

Oct. 20, 2020 (FR) .................................... 2010735

(51) Int. Cl.
  *G06T 7/00* (2017.01)
  *G06T 5/10* (2006.01)
  *G06T 5/40* (2006.01)
(52) U.S. Cl.
  CPC .............. *G06T 7/0012* (2013.01); *G06T 5/10* (2013.01); *G06T 5/40* (2013.01);
  (Continued)

(58) Field of Classification Search
  CPC .......... G06T 7/0012; G06T 5/10; G06T 5/40; G06T 2207/10116; G06T 2207/20048;
  (Continued)

(56) References Cited

U.S. PATENT DOCUMENTS

2020/0104990 A1* 4/2020 Kimura .................. G16H 30/40
2022/0036564 A1* 2/2022 Ye ............................ G06T 7/11

OTHER PUBLICATIONS

Li, Ning, et al. "Medical image enhancement method based on visual attention mechanism." IEEE, published 2018. (Year: 2018).*
(Continued)

*Primary Examiner* — Oneal R Mistry
*Assistant Examiner* — Nhut Huy Pham
(74) *Attorney, Agent, or Firm* — Baker Hostetler

(57) ABSTRACT

A method for processing a radiological image, in digital format includes at least one radiological anomaly detected using a convolutional neural network that has been trained to detect radiological anomalies on radiological examinations, the radiological image being characterized by the intensity of each of its pixels, and by at least one radiological anomaly influence map that assigns, for each pixel of the radiological image, a value representative of the proportion to which the pixel had an influence on the detection result of the radiological anomaly, which method is computer-implemented and comprises the steps of: normalizing the radiological anomaly influence maps to give normalized radiological anomaly influence maps; fusing the normalized radiological anomaly influence maps to give a single fused influence map; carrying out improvement processing on the image, using an intensity histogram, wherein the contribution of each pixel in the computing of the intensity histogram is weighted by the fused influence map.

6 Claims, 1 Drawing Sheet

(52) U.S. Cl.
CPC ............... *G06T 2207/10116* (2013.01); *G06T 2207/20048* (2013.01); *G06T 2207/20076* (2013.01); *G06T 2207/20084* (2013.01); *G06T 2207/30004* (2013.01); *G06T 2207/30168* (2013.01)

(58) Field of Classification Search
CPC . G06T 2207/20076; G06T 2207/20084; G06T 2207/30004; G06T 2207/30168
See application file for complete search history.

(56) References Cited

OTHER PUBLICATIONS

64Bitdragon, "Min-Max Normalization", https://learn.64bitdragon.com/articles/computer-science/data-processing/ min-max-normalization, this document is furnished to the Applicant, published Jan. 2, 2019 (Year: 2019).*

Li, Ning, et al. "Medical image enhancement method based on visual attention mechanism." IEEE (Year: 2018).*

Kountel, et al., "Computational Cognitive Neuroscience Approach for Saliency Map detection using Graph-Based Visual Saliency (GBVS) tool in Machine Vision", International Journal of Pure and Applied Mathematics, vol. 118(16), pp. 1207-1225, 2018.

Martinel, et al., "Kernelized Saliency-Based Person Re-Identification Through Multiple Metric Learning", IEEE Transactions on Image Processing, vol. 24, Issue: 12, pp. 5645-5658, Dec. 2015.

Jain, et al., "Score normalization in multimodal biometric systems", Pattern Recognition, vol. 38, Issue 12, pp. 2270-2285, Dec. 2005.

Szeliski, "Computer vision: algorithms and applications", Springer Science & Business Media, pp. 107-109, 2010.

Pizer, et al., "Adaptive histogram equalization and its variations", Computer vision, graphics, and image processing, vol. 39 (3), pp. 355-368, 1987.

Mohan, et al., "Modified Contrast Limited Adaptive Histogram Equalization Based on Local Contrast Enhancement for Mammogram Images", Mobile Communication and Power Engineering, edited by Vinu V Das and Yogesh Chaba, CCIS 296, pp. 397-403, 2013.

Qiu, et al., "Automatic x-ray image contrast enhancement based on parameter auto-optimization", Journal of Applied Clinical Medical Physics, vol. 18 (6), pp. 218-223, 2017.

Kwan, et al., "Improved Lung Nodule Visualization on Chest Radiographs Using Digital Filtering and Contrast Enhancement", International Scholarly and Scientific Research & Innovation, vol. 5, No. 12, pp. 700-703, 2011.

Kushol, et al.,"Contrast Enhancement of Medical X-Ray Image Using Morphological Operators with Optimal Structuring Element", ArXiv:1905.08545, 2019.

Islam, et al., "Abnormality Detection and Localization in Chest X-Rays Using Deep Convolutional Neural Networks", ArXiv:1705.09850 [Cs], 2017. https://arxiv.org/abs/1705.09850.

Rajpurkar, et al., "CheXNet: Radiologist-Level Pneumonia Detection on Chest X-Rays with Deep Learning", ArXiv:1711.05225 [Cs, Stat], 2017. http://arxiv.org/abs/1711.05225.

Selvaraju, et al., "Grad-cam: Visual explanations from deep networks via gradient-based localization", Proceedings of the IEEE international conference on computer vision, 2019, arXiv:1610.02391.

Binder, et al., "Layer-wise Relevance Propagation for Deep Neural Network Architectures", Information Science and Applications (ICISA) 2016, edited by Kuinam J. Kim and Nikolai Joukov, 376, 2016.

Zhou, et al., "Learning Deep Features for Discriminative Localization", 2016 IEEE Conference on Computer Vision and Pattern Recognition (CVPR), 2016. arXiv:1512.04150.

Zeiler, et al., "Visualizing and Understanding Convolutional Networks", ArXiv:1311.2901 [Cs], November. http://arxiv.org/abs/1311.2901, 2013.

Huang, et al., "Densely Connected Convolutional Networks", 2017 IEEE Conference on Computer Vision and Pattern Recognition (CVPR), 2017. arXiv:1608.06993.

* cited by examiner

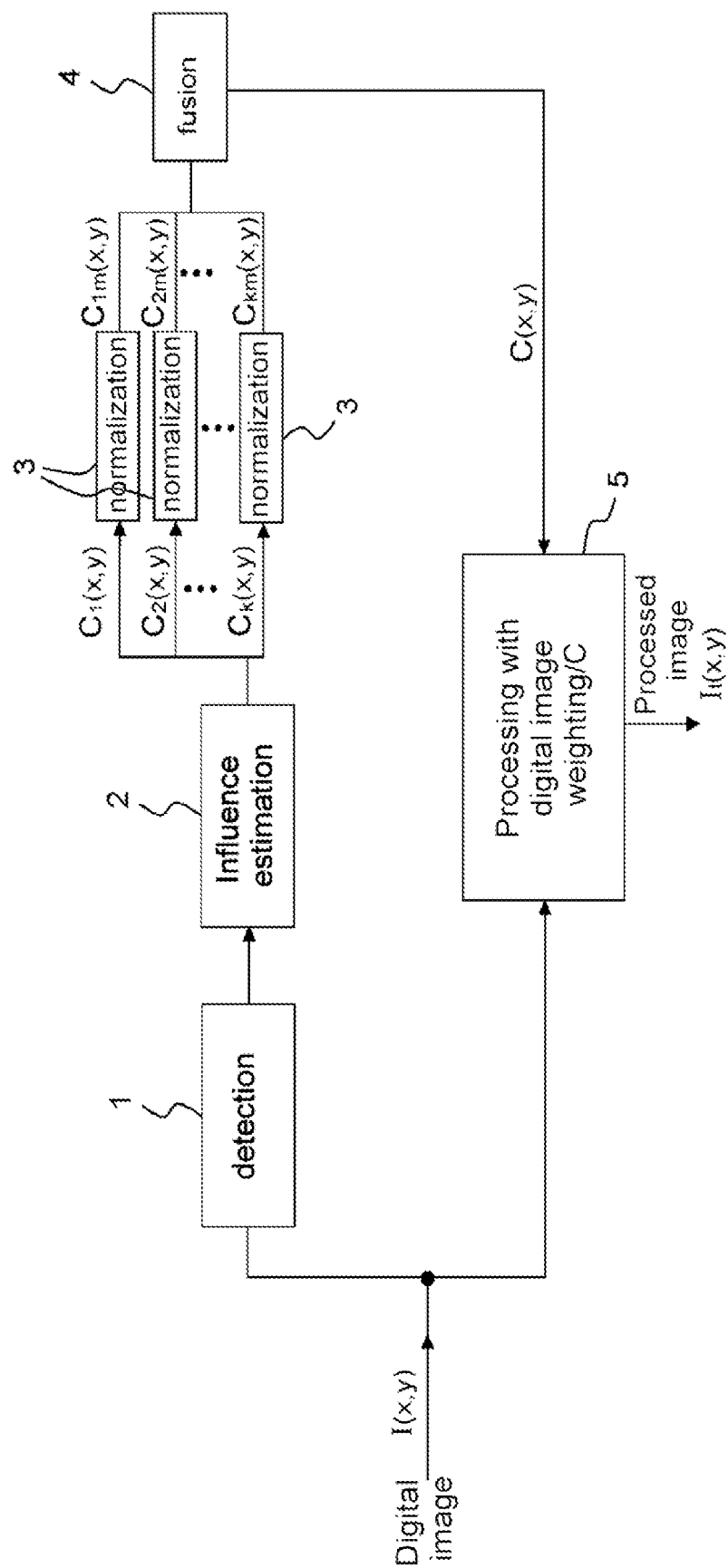

METHOD FOR PROCESSING A RADIOLOGICAL IMAGE

CROSS-REFERENCE TO RELATED APPLICATIONS

This application is a National Stage of International patent application PCT/EP2021/078760, filed on Oct. 18, 2021, which claims priority to foreign French patent application No. FR 2010735, filed on Oct. 20, 2020, the disclosures of which are incorporated by reference in their entirety.

FIELD OF THE INVENTION

The invention relates to a method for processing radiological images, and falls within the field of medical devices for exploiting images obtained by X-ray imaging, and more precisely within the field of image processing and machine learning for assisting the diagnosis of radiological examinations.

BACKGROUND

To establish a diagnosis based on a radiological examination, radiologists apply various post-processing operations (contrast optimization, windowing, contour enhancement, etc.) to the images in order to highlight certain anomalies indicating the presence of one or more pathologies. A radiological anomaly corresponds to any sign, visible in a radiological examination, that suggests a pathology in the patient. For example, these anomalies may be opacities, condensations, calcifications, infiltrations, etc.

These post-processing operations require parameterization, established by default or provided by the user, or are automatic and are based on measurements carried out on the entire image or in a region of interest (ROI) defined by the user.

These post-processing operations often require human intervention to parameterize them or to define an ROI. Therefore, defining the parameters or an ROI may take time and may prove difficult if the anomalies in question are difficult to see before these processing operations are applied. The diagnosis time may therefore be increased.

When these measures are carried out on the entire image, the results that are obtained might not be optimum in terms of visualizing anomalies located in specific regions of the image.

As an alternative, systems based on machine learning algorithms have in recent times been used to assist the diagnosis, referred to using the acronym CAD for "computer-aided diagnosis", based on radiological examinations. However, most of these are still in the experimental phase and their results are difficult to interpret. It is therefore necessary for a radiologist to study the examination in order to establish a diagnosis.

There are numerous post-processing operations for improving the quality of radiological images, notably for improving contrast. Many of these are based on histogram equalization (HE), as disclosed in the document "Computer vision: algorithms and applications", Springer Science & Business Media, by Szeliski, Richard, 2010, in paragraph 3.1.4. In this approach, the intensities of the pixels are modified so as to obtain the most homogeneous possible distribution of intensities over all of the pixels of the image. The HE algorithm does not stipulate any parameterization, but does not manage to improve the contrasts of all regions of the image.

To overcome this problem, there are numerous variants, notably contrast limited adaptive histogram equalization (CLAHE), as described in the document "Adaptive histogram equalization and its variations", Computer vision, graphics, and image processing 39 (3): 355-368, by Pizer, Stephen M, E Philip Amburn, John D Austin, Robert Cromartie, Ari Geselowitz, Trey Greer, Bart ter Haar Romeny, John B Zimmerman, and Karel Zuiderveld. 1987, and in the document "Modified Contrast Limited Adaptive Histogram Equalization Based on Local Contrast Enhancement for Mammogram Images" Mobile Communication and Power Engineering, edited by Vinu V Das and Yogesh Chaba, 296:397-403, Communications in Computer and Information Science, Berlin, Heidelberg: Springer Berlin Heidelberg, https://doi.org/10.1007/978-3-642-35864-7_60, by Mohan, Shelda, and M. Ravishankar, 2013. These variants have to be parameterized, and some works propose automatic parameterization methods. In the method "Automatic x-ray image contrast enhancement based on parameter auto-optimization", Journal of Applied Clinical Medical Physics 18 (6): 218-23, https://doi.org/10.1002/acm2, 2017, Pizer's solution is coupled with a high-pass filter and their parameters are optimized in order to maximize the entropy of the processed image. The document "Improved Lung Nodule Visualization on Chest Radiographs Using Digital Filtering and Contrast Enhancement" 5 (12): 4 by Kwan, Benjamin Y M, and Hon Keung Kwan, 2011, proposes to use HE after another processing operation or simply to apply HE to an ROI defined by the user.

Pizer's and Mohan's methods propose HE (histogram equalization) improvements to overcome the abovementioned problem. However, these methods have to be parameterized, either with default parameters that may be inappropriate for each image, or manually by the radiologist.

Kwan's method proposes applying HE after a high-pass filter, and the limitations of HE are therefore still present. As an alternative, it proposes to compute HE on an ROI, but this requires the user to define the ROI. This task therefore requires the intervention of the radiologist and may sometimes prove complicated if the radiologist does not have any information a priori on the location of the anomalies to be visualized.

The document "Automatic x-ray image contrast enhancement based on parameter auto-optimization". Journal of Applied Clinical Medical Physics 18 (6): 218-23, by Qiu, Jianfeng, H. Harold Li, Tiezhi Zhang, Fangfang Ma, and Deshan Yang, 2017, proposes a variant of Pizer's method by coupling it to a high-pass filter. It also describes an automatic parameterization strategy in which the parameters are optimized in order to maximize the entropy of the processed image.

There are other methods for improving contrast, such as that introduced in the document "Contrast Enhancement of Medical X-Ray Image Using Morphological Operators with Optimal Structuring Element", ArXiv:1905.08545 [Cs, Eess], http://arxiv.org/abs/1905.08545, 2019, by Kushol, Rafsanjany, Md Nishat Raihan, Md Sirajus Salekin, and A. B. M. Ashikur Rahman. This document also proposes a strategy for performing automatic parameterization.

In Kushol's and Qiu's approaches, all of the pixels of the image have the same influence on the computing of the variable for optimizing the parameters. The result thus obtained might not be optimum for certain regions of the image, which, as in the case of HE, would have a distribution substantially different from that of the entire image.

Recent works propose to provide assistance for the diagnosis based mostly on neural networks, more specifically on networks performing image classification. Such examples are described in the document "Abnormality Detection and Localization in Chest X-Rays Using Deep Convolutional Neural Networks", ArXiv:1705.09850 [Cs], 2017, http://arxiv.org/abs/1705.09850, by Islam, Mohammad Tariqul, Md Abdul Aowal, Ahmed Tahseen Minhaz, and Khalid Ashraf, and in the document "CheXNet: Radiologist-Level Pneumonia Detection on Chest X-Rays with Deep Learning", ArXiv:1711.05225 [Cs, Stat], http://arxiv.org/abs/1711.05225, 2017, by Rajpurkar, Pranav, Jeremy Irvin, Kaylie Zhu, Brandon Yang, Hershel Mehta, Tony Duan, Daisy Ding, et al.

Islam's or Rajpurkar's methods do not make it possible to improve the visibility of anomalies in radiological images, but they estimate the presence of radiological anomalies associated with a pathology. These technologies are still in the experimental phase and require the intervention of a radiologist to confirm the diagnosis.

A number of visual explanation methods for visually explaining the results obtained from neural networks for image classification have been proposed. These methods produce an influence map that assigns, for each pixel of the input image, a value that measures the proportion to which the pixel had an influence on the classification result. The higher the value, the more the pixel had an impact on the obtained classification result. This is the case in the document "Grad-cam: Visual explanations from deep networks via gradient-based localization", Proceedings of the IEEE international conference on computer vision, 618-626, 2017, by Selvaraju, Ramprasaath R, Michael Cogswell, Abhishek Das, Ramakrishna Vedantam, Devi Parikh, and Dhruv Batra, in the document "Layer-Wise Relevance Propagation for Deep Neural Network Architectures", Information Science and Applications (ICISA) 2016, edited by Kuinam J. Kim and Nikolai Joukov, 376:913-22, Lecture Notes in Electrical Engineering, Singapore: Springer Singapore. https://doi.org/10.1007/978-981-10-0557-2_87, by Binder, Alexander, Sebastian Bach, Gregoire Montavon, Klaus-Robert Muller, and Wojciech Samek, in the document "Learning Deep Features for Discriminative Localization", 2016 IEEE Conference on Computer Vision and Pattern Recognition (CVPR), 2921-29, Las Vegas, NV, USA: IEEE. https://doi.org/10.1109/CVPR.2016.319, by Zhou, Bolei, Aditya Khosla, Agata Lapedriza, Aude Oliva, and Antonio Torralba, and the document "Visualizing and Understanding Convolutional Networks" ArXiv:1311.2901 [Cs], November. http://arxiv.org/abs/1311.2901, 2016, by Zeiler, Matthew D., and Rob Fergus. When these methods are applied to neural networks for radiological image classification (depending on whether the images exhibit radiological anomalies), the influence maps that are produced correspond to radiological anomaly influence maps.

SUMMARY OF THE INVENTION

One aim of the invention is to overcome the abovementioned problems, and notably to improve post-processing operations on digital images in order to better highlight detected radiological anomalies, facilitate the work of the radiologist and reduce diagnosis time.

What is therefore proposed, according to one aspect of the invention, is a method for processing a radiological image I(x, y), in digital format comprising at least one radiological anomaly detected using a convolutional neural network that has been trained to detect radiological anomalies on radiological examinations. The radiological image I(x, y) is characterized by the intensity of each of its pixels I(x, y), and by at least one radiological anomaly influence map $C_k(x,y)$ that assigns, for each pixel (x,y) of the radiological image I(x, y), a value representative of the proportion to which the pixel had an influence on the detection result of the radiological anomaly k. The method is computer-implemented and comprises the steps of:

normalizing the radiological anomaly influence maps $C_k(x,y)$ to give normalized radiological anomaly influence maps $C_{kn}(x, y)$, fusing the normalized radiological anomaly influence maps $C_{kn}(x, y)$ to give a single fused influence map C(x,y);

carrying out improvement processing on the image I(x, y), using an intensity histogram, in which the contribution of each pixel in the computing of the intensity histogram is weighted by the fused influence map C(x,y).

The method of the invention makes it possible to highlight detected anomalies, to facilitate the work of the radiologist and to reduce diagnosis time.

The document "Abnormality Detection and Localization in Chest X-Rays Using Deep Convolutional Neural Networks", ArXiv:1705.09850 [Cs], 2017, http://arxiv.org/abs/1705.09850, by Islam, Mohammad Tariqul, Md Abdul Aowal, Ahmed Tahseen Minhaz, and Khalid Ashraf, and the document "CheXNet: Radiologist-Level Pneumonia Detection on Chest X-Rays with Deep Learning", ArXiv:1711.05225 [Cs, Stat], http://arxiv.org/abs/1711.05225, 2017, by Rajpurkar, Pranav, Jeremy Irvin, Kaylie Zhu, Brandon Yang, Hershel Mehta, Tony Duan, Daisy Ding, et al., disclose neural networks for identifying images comprising such radiological anomalies.

Training (or optimizing or learning) the neural network allows it to produce, for each anomaly k, a probability $p_k$ of presence based on the input image; when this probability is greater than a given threshold $\pi$, for example $\pi=0.5$, it is considered that the anomaly has been detected.

In one mode of implementation, the normalization of each anomaly influence map $C_k(x, y)$ uses the following affine transformation:

$$C_{kn}(x, y) = \frac{C_k(x, y) - \min_{u,v} C_k(u, v)}{\max_{u,v} C_k(u, v) - \min_{u,v} C_k(u, v)}$$

in which:

$C_{kn}(x, y)$ is the normalized radiological anomaly influence map of the radiological anomaly influence map $C_k(x, y)$.

Such normalization makes it possible to ensure that all of the normalized maps $C_{kn}(x, y)$ are within the same value range (between 0 and 1 in this case). This procedure makes it possible to balance the influences of the various maps during the fusion step (a map comprising values between 0 and 100 would have far more influence than a map comprising values between 0 and 1).

According to one mode of implementation, the fusion C(x, y) uses an average of the normalized radiological anomaly influence maps $C_{kn}(x, y)$ that is weighted by the probability $p_k$ of presence of each anomaly using the following relationship:

$$C(x, y) = \begin{cases} \frac{1}{|K|} \sum_{k \in K} p_k C_{kn}(x, y) & \text{if } |K| > 0 \\ 1 & \text{else} \end{cases}$$

in which:

|K| represents the number of anomalies detected; and $p_k$ represents the probability pk of presence of each anomaly, computed by the convolutional neural network.

Such fusion has the advantage of having a single map for weighting the contribution of each pixel of the image in the computing of intensity histograms.

In one mode of implementation, the processing operation uses an intensity histogram equalization, in which the computing of the histogram is modified by weighting the contribution of each pixel according to the following relationship:

$$H(u) = \sum_{x,y} C(x, y) \mathbb{1}(I(x, y) = u)$$

in which:

H(u) represents the level of the modified histogram for the intensity u; and $\mathbb{1}(x)$ represents the indicator function:

$$\mathbb{1}(x) = \begin{cases} 1 & \text{if } x \text{ is true} \\ 0 & \text{else} \end{cases},$$

I(x, y) represents the intensity of the pixel (x, y).

Such a processing operation has the advantage of improving the contrast of the image, particularly that of the areas of the image exhibiting anomalies that have been detected, since the influence of the corresponding pixels in the computing of the histogram is increased.

As a variant, the processing operation may use a variation of the method proposed in the document "Automatic x-ray image contrast enhancement based on parameter auto-optimization". Journal of Applied Clinical Medical Physics 18 (6): 218-23, by Qiu, Jianfeng, H. Harold Li, Tiezhi Zhang, Fangfang Ma, and Deshan Yang, 2017", in which the computing of the entropy of the processed image is modified using the following relationship:

$$h(I_t) = -\sum_{u \in U} p_u \log p_u$$

in which:

$h(I_t)$ represents the modified entropy of the processed image $I_t$

U represents all of the intensity levels of the digital image; and $p_u$ replaces the probability of a pixel of the digital image having the intensity u with the following relationship:

$$p_u = \frac{H(u)}{\sum_{x,y} C(x, y)}$$

in which H(u) represents the level of the modified histogram for the intensity u according to the following relationship:

$$H(u) = \sum_{x,y} C(x, y) \mathbb{1}(I(x, y) = u)$$

Such a processing operation improves the contrast of the image, particularly that of the areas of the image exhibiting anomalies that have been detected, through the relative increase in the contribution of the corresponding pixels in the computing of the entropy of the processed image.

According to another aspect of the invention, what is also proposed is a computer program product comprising program code instructions recorded on a computer-readable medium for implementing the steps of the method as described above when said program is executed on a computer.

BRIEF DESCRIPTION OF THE DRAWINGS

The invention will be better understood on studying a few embodiments that are described by way of completely non-limiting examples and illustrated by the appended drawing, in which:

FIG. 1 schematically illustrates a computer-implemented method for processing radiological images according to one aspect of the invention.

DETAILED DESCRIPTION

FIG. 1 illustrates, according to one aspect of the invention, a method for processing a radiological image I(x, y), in digital format comprising at least one radiological anomaly detected using a convolutional neural network that has been trained to detect radiological anomalies on radiological examinations 1. The radiological image I(x, y) is characterized by the intensity of each of its pixels I(x, y), and by at least one radiological anomaly influence map $C_k(x,y)$ 2 that assigns, for each pixel (x,y) of the radiological image I(x, y), a value representative of the proportion to which the pixel had an influence on the detection result of the radiological anomaly k.

The method is computer-implemented and comprises the steps of:
- normalizing 3 the radiological anomaly influence maps $C_k(x,y)$ to give normalized radiological anomaly influence maps $C_{kn}(x, y)$,
- fusing 4 the normalized radiological anomaly influence maps $C_{kn}(x, y)$ to give a single fused influence map C(x,y);
- carrying out improvement processing 5 on the image I(x, y), using an intensity histogram, in which the contribution of each pixel in the computing of the intensity histogram is weighted by the fused influence map C(x,y).

A method according to the invention makes it possible to automatically process radiological images I(x, y), which improves the visibility of the regions in which the presence of an anomaly is detected. This invention therefore facilitates the diagnosis of pathologies based on radiological examinations without the intervention of a radiologist or of another user, and provides an image in which the visibility of any radiological anomalies is improved, making them easier for a radiologist to study.

For this purpose, the existing processing operations are modified so as to increase the influence of the areas of the image in which an anomaly has been detected. The processing operations will thus be more effective on these regions, making it easier to highlight the detected anomalies.

This is achieved notably by weighting the contribution of each pixel of the image by the corresponding value of the fused influence map C(x, y) in the computing of the intensity histogram.

The detection step 1 may use a convolutional neural network that has been trained to detect radiological anomalies representative of pathologies on radiological examinations.

It is possible to use a different detection provided that there is a compatible radiological anomaly influence map estimation.

The implementation of such a neural network and the training or learning thereof are described widely in the literature. This type of network produces, for each anomaly k, a probability $p_k$ of presence based on the input image; when this probability is greater than a given threshold it, of for example $\pi=0.5$, it is considered that the anomaly has been detected. Using K to denote all of the anomalies detected:

$$k \in K \text{ if and only if } p_k > \pi$$

This type of network often requires the input image to have a precise resolution and a precise number of channels (one for a grayscale image, three for an RGB image). If the input image has a different resolution, the image may be redimensioned to the required resolution and the number of channels may be adapted.

For example, (Rajpurkar et al. 2017) use the DenseNet-121 (Huang, Gao, Zhuang Liu, Laurens Van Der Maaten, and Kilian Q. Weinberger. 2017. "Densely Connected Convolutional Networks". In 2017 *IEEE Conference on Computer Vision and Pattern Recognition* (CVPR), 2261-69. Honolulu, HI: IEEE. https://doi.org/10.1109/CVPR.2017.243) network architecture, which takes three-channel images of size 224×224 at input. In this case, the radiological images, having an arbitrary resolution and a single channel, are redimensioned to 224×224 and converted to three channels, repeating the same value for each channel.

The influence estimation step 2 may be implemented in accordance with the estimations from the prior art, for example, as proposed in the document "Grad-cam: Visual explanations from deep networks via gradient-based localization" Proceedings of the IEEE international conference on computer vision, 618-626, 2017, by Selvaraju, Ramprasaath R, Michael Cogswell, Abhishek Das, Ramakrishna Vedantam, Devi Parikh, and Dhruv Batra, compatible with a multitude of different architectures, which produces a map with a resolution equal to the resolution of the output from a chosen convolution layer in the architecture of the detection network. The radiological anomaly influence map then has to be redimensioned, for example by bilinear interpolation, to the original resolution of the image.

$C_k(x, y)$ is used to denote the radiological anomaly influence map corresponding to the detected anomaly k.

For example, when the influence estimation 2 from Selvaraju, Ramprasaath R, Michael Cogswell, Abhishek Das, Ramakrishna Vedantam, Devi Parikh, and Dhruv Batra is applied to the last convolution layer of the detection from Rajpurkar, Pranav, Jeremy Irvin, Kaylie Zhu, Brandon Yang, Hershel Mehta, Tony Duan, Daisy Ding, the output resolution is 7×7. The radiological anomaly influence map is then redimensioned to the size of the original image.

Any other radiological anomaly influence map estimation 2 compatible with the chosen detection method may be valid.

With regard to the step of normalizing 3 each radiological anomaly influence map $C_k(x, y)$, one possible implementation is that of applying an affine transformation so that all of the values are between 0 and 1:

$$C_{kn}(x, y) = \frac{C_k(x, y) - \min_{u,v} C_k(u, v)}{\max_{u,v} C_k(u, v) - \min_{u,v} C_k(u, v)}$$

in which $C_{kn}(x, y)$ is the normalized map of the radiological anomaly influence map $C_k(x, y)$.

The radiological anomaly influence maps $C_k(x, y)$ may be normalized differently.

One implementation solution for the step of fusing 4 the normalized radiological anomaly influence maps $C_{kn}(x, y)$ of each detected anomaly k is that of taking the average of the maps weighted by the probability of presence of each anomaly k:

$$C(x, y) = \begin{cases} \frac{1}{|K|} \sum_{k \in K} p_k C_{kn}(x, y) & \text{if } |K| > 0 \\ 1 & \text{else} \end{cases}$$

in which
|K| represents the number of anomalies detected; and
$p_k$ represents the probability $p_k$ of presence of each anomaly, computed by the convolutional neural network.

As a variant, the maps may be fused differently.

The processing step may use an intensity histogram equalization, in which the computing of the histogram is modified by weighting the contribution of each pixel according to the following relationship:

$$H(u) = \sum_{x,y} C(x, y) \mathbb{1}(I(x, y) = u)$$

in which:
H(u) represents the level of the modified histogram for the intensity u; and
$\mathbb{1}(x)$ represents the indicator function:

$$\mathbb{1}(x) = \begin{cases} 1 & \text{if } x \text{ is true} \\ 0 & \text{else} \end{cases} ;$$

I(x, y) represents the intensity of the pixel (x, y).

As a variant, the processing operation may use a variation of the method proposed in the document "Automatic x-ray image contrast enhancement based on parameter auto-optimization". Journal of Applied Clinical Medical Physics 18 (6): 218-23, by Qiu, Jianfeng, H. Harold Li, Tiezhi Zhang, Fangfang Ma, and Deshan Yang, 2017", in which the computing of the entropy of the processed image is modified using the following relationship.

$$h(I_t) = -\sum_{u \in U} p_u \log p_u$$

in which:
$h(I_t)$ represents the modified entropy of the processed image It
U represents all of the intensity levels of the digital image; and
$p_u$ replaces the probability of a pixel of the digital image having the intensity u with the following relationship:

$$p_u = \frac{H(u)}{\sum_{x,y} C(x, y)}$$

in which H(u) represents the level of the modified histogram for the intensity u according to the following relationship:

$$H(u) = \sum_{x,y} C(x, y) \mathbb{1}(I(x, y) = u)$$

The processing 5 may also be applied differently to the abovementioned processing methods and to other known processing methods.

The present invention may be implemented on a computer program product comprising computer-executable computer code, stored on a computer-readable medium and designed to implement the method as described above.

The invention may be implemented on a local computer or on a distributed networked platform.

The invention claimed is:

1. A method for processing a radiological image I(x, y), in digital format comprising at least one radiological anomaly detected using a convolutional neural network that has been trained to detect radiological anomalies on radiological examinations, the radiological image I(x, y) being characterized by an intensity of each of its pixels (x, y), and by at least one radiological anomaly influence map $C_k$(x, y) that assigns, for each pixel (x, y) of the radiological image I(x, y), a value representative of the proportion to which the pixel had an influence on a detection result of the radiological anomaly k, the method being computer-implemented and comprising the steps of:

normalizing the radiological anomaly influence maps $C_k$(x, y) to give normalized radiological anomaly influence maps $C_{kn}$(x, y);

fusing the normalized radiological anomaly influence maps $C_{kn}$(x, y) to give a single fused influence map C(x, y);

carrying out improvement processing on the image I(x, y), using an intensity histogram, wherein a contribution of each pixel in the computing of the intensity histogram is weighted by the fused influence map C(x, y), wherein the fused influence map C x, y) uses an average of the normalized radiological anomaly influence maps $C_{kn}$(x, y) that is weighted by the probability $p_k$ of presence of each anomaly using the following relationship:

$$C(x, y) = \begin{cases} \frac{1}{|K|} \sum_{k \in K} p_k C_{kn}(x, y) & \text{if } |K| > 0 \\ 1 & \text{else} \end{cases}$$

wherein

|K| represents the number of anomalies detected; and $p_k$ represents the probability $p_k$ of presence of each anomaly, computed by the convolutional neural network.

2. The method as claimed in claim 1, wherein the normalization of each anomaly influence map $C_k$(x, y) uses the following affine transformation:

$$C_{kn}(x, y) = \frac{C_k(x, y) - \min_{u,v} C_k(u, v)}{\max_{u,v} C_k(u, v) - \min_{u,v} C_k(u, v)}$$

wherein:

$C_{kn}$(x, y) is the normalized radiological anomaly influence map of the radiological anomaly influence map $C_k$(x, y).

3. A method for processing a radiological image I(x, y), in digital format comprising at least one radiological anomaly detected using a convolutional neural network that has been trained to detect radiological anomalies on radiological examinations, the radiological image I(x, y) being characterized by an intensity of each of its pixels I(x, y), and by at least one radiological anomaly influence map Ck (x, y) that assigns, for each pixel (x, y) of the radiological image I x, y), a value representative of the proportion to which the pixel had an influence on a detection result of the radiological anomaly k, the method being computer-implemented and comprising the steps of:

normalizing the radiological anomaly influence maps $C_k$(x, y) to give normalized radiological anomaly influence maps $C_{kn}$(x, y);

fusing the normalized radiological anomaly influence maps $C_{kn}$(x, y) to give a single fused influence map C(x, y);

carrying out improvement processing on the image I (x, y), using an intensity histogram, wherein a contribution of each pixel in the computing of the intensity histogram is weighted by the fused influence map C(x, y);

wherein the improvement processing uses an intensity histogram equalization, wherein the computing of the intensity histogram is modified by weighting the contribution of each pixel according to the following relationship:

$$H(u) = \sum_{x,y} C(x, y) \mathbb{1}(I(x, y) = u)$$

wherein

H(u) represents the level of the modified histogram for the intensity u; and $\mathbb{1}$(x) represents the indicator function:

$$\mathbb{1}(x) = \begin{cases} 1 & \text{if } x \text{ is true} \\ 0 & \text{else} \end{cases};$$

I(x, y) represents the intensity of the pixel (x, y).

4. A computer program product comprising program code instructions recorded on a non-transitory computer-readable medium for implementing the steps of the method as claimed in claim 1, when said program is executed on a computer.

5. The method as claimed in claim 3, wherein the normalization of each anomaly influence map $C_k$(x, y) uses the following affine transformation:

$$C_{kn}(x, y) = \frac{C_k(x, y) - \min_{u,v} C_k(u, v)}{\max_{u,v} C_k(u, v) - \min_{u,v} C_k(u, v)}$$

wherein:

$C_{kn}(x, y)$ is the normalized radiological anomaly influence map of the radiological anomaly influence map $C_k(x, y)$.

6. A computer program product comprising program code instructions recorded on a non-transitory computer-readable medium for implementing the steps of the method as claimed in claim 4, when said program is executed on a computer.

* * * * *